(12) United States Patent
Nitschke et al.

(10) Patent No.: US 8,273,691 B2
(45) Date of Patent: Sep. 25, 2012

(54) METHOD FOR BINDING NON-SOLID OXIDIC INORGANIC MATERIALS WITH ETHERIFIED AMINOPLAST RESINS AND CURED COMPOSITIONS OF SAID MATERIALS AND ETHERIFIED AMINOPLAST RESINS

(75) Inventors: Christian Nitschke, Speyer (DE); Christian Spindler, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/061,220

(22) PCT Filed: Aug. 28, 2009

(86) PCT No.: PCT/EP2009/061118
§ 371 (c)(1),
(2), (4) Date: Feb. 28, 2011

(87) PCT Pub. No.: WO2010/023268
PCT Pub. Date: Mar. 4, 2010

(65) Prior Publication Data
US 2011/0152134 A1 Jun. 23, 2011

(30) Foreign Application Priority Data
Aug. 29, 2008 (EP) ..................................... 08163293

(51) Int. Cl.
*C09K 8/60* (2006.01)

(52) U.S. Cl. ........ 507/219; 507/220; 507/131; 507/133; 507/239; 507/244; 166/285; 166/292; 166/294; 166/295

(58) Field of Classification Search .................. 507/220, 507/131, 133, 219, 239, 244, 246, 903, 906; 166/285, 292, 294, 295
See application file for complete search history.

(56) References Cited

U.S. PATENT DOCUMENTS

| | | | |
|---|---|---|---|
| 4,199,484 A | 4/1980 | Murphey | |
| 5,670,567 A | 9/1997 | Lahalih | |
| 6,311,773 B1 | 11/2001 | Todd et al. | |
| 2003/0230431 A1 | 12/2003 | Reddy et al. | |
| 2006/0240995 A1 | 10/2006 | Rickman et al. | |
| 2008/0217002 A1 | 9/2008 | Simonds et al. | |

FOREIGN PATENT DOCUMENTS

| | | |
|---|---|---|
| CA | 2314392 A1 | 1/2001 |
| CA | 2637696 A1 | 11/2001 |
| CA | 2497722 A1 | 8/2005 |
| CN | 1075114 A | 8/1993 |
| DE | 1012035 B | 7/1957 |
| DE | 1160141 B | 12/1963 |
| DE | 2400908 A1 | 12/1974 |
| DE | 2843452 A1 | 4/1979 |
| GB | 1172116 A | 11/1969 |
| GB | 1453001 A | 10/1976 |
| JP | 02-197348 A | 8/1990 |
| RU | 2048950 C1 | 11/1995 |
| RU | 2151301 C1 | 6/2000 |

OTHER PUBLICATIONS

Yang, Ming et al. Beijing Huagong Daxue Xuebao, Ziran Kexueban (2003), 30(4), 81-84).

Wasnik A et al, "Application of Resin System for Sand Consolidation, Mud-Loss Control, and Channel Repairing"—SPE/PS-CIM/Choa International Thermal Operations and Heavy Oil Symposium, Calgary, Alberta, Canada, Society of Petroleum Engineers, US, Bd. 1, Nr. SPE 97771-MS 2005, Nov. 1, 2005, Seiten 424-434, XP 08115233.

*Primary Examiner* — Alicia Toscano
(74) *Attorney, Agent, or Firm* — Connolly Bove Lodge & Hutz LLP

(57) ABSTRACT

The present invention relates to a process for binding non-consolidated oxidic inorganic materials with curable formulations which comprise etherified amino resins, and to cured compositions obtainable by the process. A preferred embodiment of the invention comprises a process for stabilizing underground formations composed of oxidic inorganic materials, wherein the curable composition is injected into the underground formation and cured at the temperatures which exist in the formation.

15 Claims, No Drawings

METHOD FOR BINDING NON-SOLID OXIDIC INORGANIC MATERIALS WITH ETHERIFIED AMINOPLAST RESINS AND CURED COMPOSITIONS OF SAID MATERIALS AND ETHERIFIED AMINOPLAST RESINS

CROSS-REFERENCE TO RELATED APPLICATIONS

This application is a national stage application (under 35 U.S.C. §371) of PCT/EP2009/061118, filed Aug. 28, 2009, which claims benefit of European application 08163293.7, filed Aug. 29, 2008, the contents of which are incorporated herein by reference in their entireties.

FIELD OF THE INVENTION

The present invention relates to a process for binding non-consolidated oxidic inorganic materials with curable formulations which comprise etherified amino resins, and to cured compositions obtainable by the process. A preferred embodiment of the invention comprises a process for stabilizing underground formations composed of oxidic inorganic materials, wherein the curable composition is injected into the underground formation and cured at the temperatures which exist in the formation.

BACKGROUND

In oil and gas exploration, hydrocarbons or the customary hydrocarbon-water mixtures are often found in unconsolidated sand and rock layers. Production can discharge sand particles from the rock formation together with the hydrocarbon-water mixture as a result of the shear forces which occur in production. The sand particles can penetrate, for example, into the production chain, into pumping apparatus underground and at the surface, and into installed water separators and pipeline systems, and lead therein to corrosion, abrasion, or to faults and reduced function.

It is also known that production boreholes can be stimulated by breaking up hydrocarbon-containing rock (known as fracturing). In order to keep the cracks obtained open over a prolonged period even under production conditions, proppants, for example sands or bauxite particles, are pumped into the cracks obtained. Such particles can likewise be discharged from the fissure as described. In addition to the problems described above, this can additionally lead to the effect that the cracks formed in the rock close again and the production rate of the hydrocarbon produced declines significantly.

The prior art discloses various techniques for preventing the discharge of sand from the formation together with the hydrocarbon-water mixture into the borehole, the subsequent production chain and the equipment used.

For example, gravel packings and mechanical sand filters can be installed in the production borehole in order to suppress the transport of sand out of the borehole. Such systems are described, for example, in CA 2,314,392 or US 2008 217 002 A1.

Secondly, a mobile resin can be pumped into the unconsolidated sand layer and cured therein. In the systems described in the prior art, according to the temperature in the borehole, an appropriate hardener, for example an organic amine, can be added. The resin can be pumped into the formation together with the hardener directly as a liquid or applied to a carrier, for example small sand particles. The resin causes contact adhesion of the sand grains present in the formation, such that the sand grains can no longer be discharged, but it is still possible for the hydrocarbon to flow through the now consolidated sand.

The cured resin has to be stable to hydrolysis over a long period in the borehole at the deposit temperatures which exist, and must also not be dissolved at all by the hydrocarbon produced.

For example, GB 1,172,116 and GB 1,453,001 describe the use of furfuryl alcohol-based resin systems which are pumped into the formation in an organic solvent. DE 28 43 452 and CA 2 637 696 describe systems based on epoxy resins.

In other fields of industry too, there is a need to consolidate inorganic particles by means of suitable measures, for example in mining, in order to prevent the detachment of loose rock when tunneling, or else protect rock from weathering or oxidation. For example, CA 2 497 722 describes the use of two-component elastomeric resin systems which are applied to the surface of the rock and lead to film formation there.

Further examples comprise the prevention of dust evolution or the consolidation of soil. For instance, RU 2151301 describes the prevention of dust evolution by binding the dust with polyvinyl butyral and sand.

The consolidation of sand in above-ground applications is likewise of great industrial interest. For example, molds are produced for a wide variety of different applications, for example for metal casting, from sand with the aid of adhesives. For instance, applications CN 1075114 A, DE 24 00 908, DE 1012035 and JP 02 197 348 A2 describe the use of urea-formaldehyde resins for production of molds, using different molar ratios of urea to formaldehyde and different hardeners.

It is also known that the use properties of such molds can be improved by adding further additives, for example furfuryl alcohol (DE 1160141), the conversion of urea-formaldehyde resins to sulfonates (Yang, Ming et al. Beijing Huagong Daxue Xuebao, Ziran Kexueban (2003), 30(4), 81-84) or the addition of phenol-containing additives (CS 247931).

The consolidation of sand layers, both above and below ground, by means of urea-formaldehyde systems is disclosed by US 2006 240995, U.S. Pat. No. 6,311,773, RU 2048950 and U.S. Pat. No. 5,670,567.

BRIEF SUMMARY

It was an object of the invention to find an improved process for binding non-consolidated oxidic inorganic particles, especially silicon dioxide, with the aid of resins for a wide variety of different applications. In this context, water-based resins should preferably be used.

Accordingly, a process has been found for binding non-consolidated oxidic inorganic materials by contacting the inorganic materials with a curable composition comprising at least one curable resin, followed by thermal curing of the resin, wherein the resin is an etherified amino resin, the amount of the curable composition being 0.5 to 60% by weight based on the inorganic materials, and the curing being undertaken at a temperature from greater than 0° C. to 280° C.

In addition, solid compositions formed from inorganic particles and a cured resin have been found, which are obtainable by the process outlined.

A preferred embodiment of the invention comprises a process for stabilizing underground formations composed of oxidic inorganic materials, wherein the curable composition is injected into the underground formation and cured at the temperatures which exist in the formation.

In a further embodiment of the invention, the invention relates to a solid composition obtainable by mixing one or more etherified amino resins, one or more hardeners, with silicon dioxide particles, water and/or another solvent, and curing the resulting mixture at room temperature or elevated temperatures.

In a further embodiment of the invention, the invention relates to the use of etherified amino resins and one or more hardeners for production of water-resistant solid sand compositions.

DETAILED DESCRIPTION OF THE PREFERRED EMBODIMENTS

Specific details of the invention are as follows:

To execute the invention, a curable composition comprising at least one etherified amino resin is used.

Amino resins are known in principle to those skilled in the art. These are relatively low molecular weight polycondensation products formed from compounds having NH groups with carbonyl compounds. Examples of suitable compounds having NH groups comprise urea, melamine, urethanes or aromatic amines. The carbonyl compounds preferably comprise formaldehyde, but may also be higher aldehydes or ketones.

Etherified amino resins are also known in principle to those skilled in the art. They are obtained by etherifying all or some of the OH groups of amino resins with alcohols. Suitable alcohols are especially aliphatic $C_1$- to $C_{10}$-monoalcohols, preferably aliphatic $C_1$- to $C_4$-monoalcohols and $C_1$- to $C_{10}$-dialcohols. Examples comprise methanol, ethanol, butanol, 1,2-ethanediol or 1,4-butanediol. Preferably, etherified amino resins having urethane groups can be used. These are obtainable by using at least partly $C_1$- to $C_{10}$-dialcohols for the etherification, or etherifying compounds which have been etherified with monoalcohols subsequently with dialcohols. Etherified amino resins are commercially available.

The etherified amino resins can also be modified with further additives for use. Examples of such additives comprise 3-aminopropyltrimethoxysilane, 3-aminopropyltriethoxysilane, (3-glycidoxypropyl)trimethoxysilane, polytetrahydrofuran or phenol-formaldehyde resins.

Amino resins and etherified amino resins can be cured to thermosets for use. In general, a hardener, preferably an acidic hardener, is used for this purpose, not that the use of hardeners is absolutely necessary in every case. Suitable hardeners for amino resins are known to those skilled in the art. Examples of suitable hardeners comprise inorganic or organic acids and/or salts thereof. Examples of such hardeners comprise ammonium chloride, ammonium nitrate or maleic acid. It will be appreciated that it is also possible to use mixtures of two or more hardeners.

In a preferred embodiment of the invention, the etherified amino resins are etherified urea-formaldehyde resins. Such resins are obtainable by reacting urea and formaldehyde with subsequent etherification. Etherified urea-formaldehyde resins are commercially available.

The preferred etherified urea-formaldehyde resins obtain structural units of the general formula (I) and/or (II).

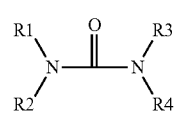
(I)

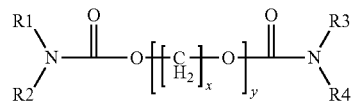
(II)

In these formulae, the R1, R2, R3 and R4 radicals are each substituents selected from the group of H, —CH$_2$—OH and —CH$_2$—OR', with the proviso that at least one of the R1, R2, R3 and R4 radicals is a —CH$_2$—OR' radical.

In the above formula, R' is an aliphatic hydrocarbyl radical having 1 to 10 carbon atoms, especially a radical having 1 to 4 carbon atoms. R' is preferably a methyl, ethyl or n-butyl radical, more preferably a methyl or n-butyl radical, In the formula (II), x is from 2 to 8, preferably 4, and y is from 1 to 20, preferably 1 to 10.

Compounds of the formula (I) are obtained by reacting urea with formaldehyde and at least one aliphatic monoalcohol having 1 to 10 carbon atoms, preferably 1 to 4 carbon atoms, under conditions known to those skilled in the art. Compounds of the formula (II) can advantageously be obtained by reacting compounds of the formula (I) additionally with a dialcohol of the general formula (III)

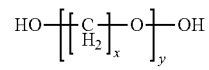
(III)

Such a reaction is also known as a carbamatization. It will be appreciated that said dialcohol can also be used from the very start for etherification. Preferred dialcohols comprise 1,4-butanediol and polytetrahydrofuran having a mean degree of polymerization of 1 to 20, preferably 1 to 10.

It is clear to the person skilled in the art in the field of condensation reactions that such a reaction affords a mixture of different compounds (I) and (II). In addition, such a mixture may comprise as yet unconverted urea. The mixture can generally be used without further purification, but it is of course also possible to specifically isolate compounds having a very particular formula (I) or (II).

To prepare the etherified urea-formaldehyde resins, urea and formaldehyde are used in a molar ratio of 1:1 to 1:4. The monoalcohol used for etherification is preferably used in a molar ratio of 0.1:1 to 1:1 based on the formaldehyde used. The dialcohol may optionally be used in a molar ratio of 0.1:1 to 0.7:1 based on the urea. The table which follows summarizes typical molar ratios and preferred molar ratios:

|  |  | Urea | Formaldehyde | Monoalcohol | Dialcohol |
|---|---|---|---|---|---|
|  | minimum | 1 | 1 | 0.1 | optionally 0.1 |
|  | maximum | 1 | 4 | 4 | optionally 0.7 |
| preferred | minimum | 1 | 1.5 | 0.5 | 0.1 |
|  | maximum | 1 | 3.0 | 1.9 | 0.5 |
| especially preferred | minimum | 1 | 1.7 | 0.5 | 0.35 |
|  | maximum | 1 | 2.5 | 1.2 | 0.55 |

To execute the invention, preference is given to using etherified urea-formaldehyde resins which comprise compounds of the general formula (II), i.e. those which are synthesized using dialcohols. Such etherified urea-formaldehyde resins accordingly comprise urethane groups; they are accordingly also referred to as carbamatized resins.

It will be appreciated that it is also possible to use mixtures of two or more different etherified urea-formaldehyde resins. In addition, it is optionally possible, as well as the etherified urea-formaldehyde resins, also to use further curable resins. In such mixtures, the amount of etherified urea-formaldehyde resins should, however, be 50% by weight based on the amount of all resins used, preferably at least 75% by weight, more preferably at least 90% by weight, and most preferably the resins used should exclusively be etherified urea-formaldehyde resins. Examples of further curable resins comprise phenol-formaldehyde resins, melamine-formaldehyde resins, etherified melamine-formaldehyde resins or melamine-urea-formaldehyde resins.

The etherified amino resins used, especially the etherified urea-formaldehyde resins, can be used in accordance with the invention as such, i.e. without additional solvents. However, they can also be dissolved in suitable solvents for use, or used in dispersion. With regard to the solvents, there do not exist any fundamental restrictions, provided that the resins are soluble or dispersible therein to a sufficient degree. Suitable solvents are especially water and polar organic solvents, especially water-miscible organic solvents. Examples of suitable solvents comprise water, methanol, ethanol, n-propanol, i-propanol, n-butanol and i-butanol. A particularly preferred solvent is water. The concentration of the resins can be determined by the person skilled in the art according to the desired end use.

The etherified amino resins used, especially the etherified urea-formaldehyde resins, may further comprise further additives. Examples of such additives comprise silanes or siloxanes, diamines, dicarboxylic acids, diols, polyols or polyetherols. Examples of such additives comprise butanediol, diethylene glycol, triethylene glycol or polyethylene glycols, preferably those having a number-average molecular weight $M_n$ of not more than 1000 g/mol, polytetrahydrofurans, preferably those having a number-average molecular weight $M_n$ of not more than 1000 g/mol, glycerol, such as 3-aminopropyltrimethoxysilane, 3-aminopropyltriethoxysilane or (3-glycidoxypropyl)trimethoxysilane. The weight ratio of such additives to the resin used is—if present—generally 1 to 20% by weight based on the amount of all resins. The amount is determined by the person skilled in the art according to the desired properties.

To cure the etherified amino resins, especially the etherified urea-formaldehyde resins, the customary hardeners known to those skilled in the art may in principle be used to the curable compositions, although the use of separate hardeners is not absolutely necessary in each case. Especially at temperatures above 100° C., it may be possible to dispense with the addition of a separate hardener, whereas the presence of a hardener is generally necessary or at least advantageous at temperatures below 100° C. Examples of suitable hardeners comprise especially acidic hardeners such as inorganic or organic acids and/or salts thereof, for example maleic acid or maleic anhydride, p-toluenesulfonic acid, methanesulfonic acid, formic acid, phosphoric acid, ammonium chloride, ammonium bromide, ammonium nitrate, ammonium phosphate or ammonium sulfate. It will be appreciated that it is also possible to use mixtures of two or more hardeners. It has been found to be especially useful to use mixtures of two different hardeners when crosslinking is to be effected at relatively low temperatures, for example at temperatures from 15 to 40° C. The type and amount of the hardener is selected by the person skilled in the art according to the desired properties of the curable composition. The amount of the hardener can be used by the person skilled in the art to determine, for example, the desired curing rate. A useful amount—if present—has been found to be an amount of 0.1 to 20% by weight based on the resin, preferably an amount of 0.1 to 10% by weight.

Particularly advantageous hardener combinations are those of an acid, especially maleic acid or maleic anhydride, p-toluenesulfonic acid, methanesulfonic acid, formic acid, phosphoric acid, and an ammonium salt, especially ammonium chloride, ammonium bromide, ammonium nitrate, ammonium phosphate or ammonium sulfate. The hardeners may be used in a weight ratio of 1:9 to 9:1, preferably 1:4 to 4:1, and more preferably in approximately equal proportions. Particularly advantageous combinations comprise maleic anhydride/ammonium nitrate, maleic anhydride/ammonium sulfate, maleic anhydride/ammonium phosphate, maleic anhydride/ammonium bromide, phosphoric acid/ammonium nitrate, phosphoric acid/ammonium sulfate, phosphoric acid/ammonium phosphate, phosphoric acid/ammonium bromide, methanesulfonic acid/ammonium nitrate, methanesulfonic acid/ammonium sulfate, methanesulfonic acid/ammonium phosphate, methanesulfonic acid/ammonium bromide, formic acid/ammonium nitrate, formic acid/ammonium sulfate, formic acid/ammonium phosphate and formic acid/ammonium bromide.

The curable compositions described, composed of resins, and optionally hardeners and further components, are used in accordance with the invention for binding non-consolidated oxidic inorganic materials, preferably for binding oxidic inorganic particles. This gives rise to solid compositions which comprise a cured resin and non-consolidated oxidic inorganic materials, preferably oxidic inorganic particles.

The term "oxidic inorganic materials" shall comprise all kinds of oxidic inorganic materials, and the term should also comprise materials having hydroxide groups. The inorganic materials may either originate from natural sources or they may be synthetic materials. Examples of inorganic oxidic materials comprise silicon dioxide and silicates, for example silicatic minerals such as quartz, feldspars, aluminosilicates, clays or sheet silicate. In addition, they may, for example, be aluminum oxides or hydroxides, for example bauxite or aluminates. They may of course also be mixtures of different materials.

The term "non-consolidated" shall be understood to mean firstly materials which comprise particles of oxidic inorganic materials. These may, for example, be coarse bulk materials composed of oxidic inorganic materials, for example sand, gravel or rocks, or else fine powders of inorganic oxidic materials such as pigments.

Oxidic inorganic particles generally have a particle size of less than 20 mm, preferably less than 5 mm, without any intention that the invention be restricted to this particle size, The particle size figures relate to the particle sizes determined by means of a screen analysis. This is thus not necessarily the primary particle size, but the particles may also be agglomerates of smaller particles. Preferably, particles having a particle size of 0.01 mm to 2 mm, more preferably 0.1 to 1 mm, may be used. It is clear to a person skilled in the art that these are average values. Mixtures of different particles may of course also have bimodal or polymodal particle size distributions.

Preferably, the invention may be executed using silicon dioxide particles, especially sand, especially those having a particle size of approx. 0.1 mm to 1.3 mm. Preferred silicon dioxide particles have a purity of 80 to 100% by weight, based on the total amount of silicon dioxide particles and impurities.

Impurities in addition to the silicon dioxide particles may, for example, be feldspars or clays.

The term "non-consolidated" shall further also be understood to mean those oxidic inorganic materials which have pores, cracks, fractures or fissures. Examples of such materials comprise rock layers having pores, cracks or fissures. Although such rock layers typically appear microscopically as a consolidated structure, the stability thereof can be impaired, in some cases considerably, by pores, cracks, fractures or fissures.

To execute the invention, the described curable composition composed of resins and optionally hardeners and further components is contacted with the non-consolidated oxidic inorganic materials. The method of "contacting" is guided by the arrangement of the oxidic inorganic materials which are to be bound by the resin.

If the material is a loose bed of oxidic inorganic particles, they can simply be mixed with the curable composition—optionally using suitable mixing units. The mixtures obtained can then be shaped to the desired form and cured.

When the non-consolidated oxidic inorganic materials or oxidic inorganic particles which have already been arranged in an immobile manner at a particular site, for example sand joints, sand pathways, underground formations composed of sand or other oxidic inorganic particles which are to be drilled through, or loose rock material which is to be drilled through, the use of mixing units is of course not possible. In this case, the curable composition can be sprayed onto the mixture to be consolidated, or forced or injected into the material to be consolidated.

The amount of the curable composition for use for binding is determined by the person skilled in the art according to the desired properties of the solid composition composed of cured resin and oxidic inorganic particles. It is guided, for example, by the desired strength. A useful amount has been found to be an amount of 0.5 to 60% by weight of resin, based on the oxidic inorganic particles, especially 1 to 40%, preferably 2 to 25% and more preferably 3 to 15%.

To bind the non-consolidated oxidic inorganic materials, the curable resin is subsequently cured at temperatures of greater than 0° C. to 280° C., preferably 5 to 200° C. and more preferably 10 to 180° C. The curing is also guided by the arrangement of the oxidic inorganic particles which are to be bound. Mobile shaped bodies can be heated for curing, for example in a suitable furnace. The curing temperature here may be guided by the nature of the hardener. In the case of non-consolidated oxidic inorganic materials arranged in an immobile manner at a particular site, the curing temperature is generally determined automatically by the temperature existing on site, for example the temperature of the underground sand formation. To the extent that it is technically possible, the person skilled in the art can, however, also introduce heat for curing into such immobile formations.

The process according to the invention can be used to bind a wide variety of different types and arrangements of non-consolidated oxidic inorganic particles.

For example, it is possible to produce shaped bodies from oxidic inorganic particles, preferably silicon dioxide or sand. In addition, it is possible, for example, to consolidate sand joints, excavation pits or pathways by means of the process according to the invention, and the process can be used for rock consolidation and in tunnel construction.

The process can be used particularly advantageously in mineral oil and natural gas production. Examples comprise the binding of sand formations which are to be drilled through. For this purpose, the curable composition described is pumped into the unconsolidated underground sand layer, and cured there.

In this context, the procedure may be, for example, that—once the sand layer has been drilled through or else the borehole has already been completed—the curable composition is injected into the formation to be treated with the aid of pumps. For this purpose—according to the type of resins used—generally a curable composition which additionally comprises at least one solvent, preferably water, is used. The concentration of the resin in the curable composition should be adjusted here such that the hydraulic pressure generated by the pumps is sufficient to press the resin mixture into the formation to be consolidated, and the curable composition can penetrate sufficiently far into the formation. For this application, it has therefore been found to be useful to use curable compositions whose viscosity does not exceed 30 mPas, preferably 10 mPas, in each case measured at 25° C. The concentration of the resins in such curable compositions is generally 5 to 50% by weight based on the sum of all components of the curable composition.

When the curable composition used comprises a hardener, the hardener of the composition is mixed with the resin before the introduction of the formulation into the formation. The type and amount of the hardener should be selected here such that crosslinking does not proceed until after the curable composition has been placed within the formation. This is generally the case—according to the type of formation—1 to 6 h after the curable composition has been made up.

The loss of proppants after stimulation can be prevented by pumping the composition described into the crack after the proppant has been positioned, and curing it therein. The resin likewise cures within the cracks and thus prevents the proppant from being forced out of the crack during the production of the hydrocarbon.

Further applications comprise applications in mining, in order to prevent the detachment of loose rock while tunneling, or else to protect the rock from weathering or oxidation.

The process can also be used to prevent the evolution of dust or to stabilize soils, for example in mining or else in the consolidation of unasphalted roads.

The etherified amino resins used, especially etherified urea-formaldehyde resins, have a series of advantages over unetherified systems. They have, for example, significantly improved stability with respect to water, brine and organic solvents, and can accordingly be used particularly efficiently for tasks in mineral oil and natural gas production, where they come into contact both with (salt-containing) water and with hydrocarbons.

Urea-formaldehyde resins etherified with short-chain alcohols, especially with methanol, have sufficient water solubility for use in industrially viable concentrations. For use of such resin compositions, it is possible to dispense with the addition of organic solvents and to work with aqueous compositions.

It has additionally been found that the setting time of the curable compositions used can be adjusted accurately with acid-based hardener systems, which is generally required for underground applications.

The examples which follow are intended to illustrate the invention in detail.

1. Test Series

For a first test series, commercial etherified amino resins were used:

Resin 1 Commercial melamine-formaldehyde resin etherified with methanol to a high degree, dissolved in a methanol-water mixture, solids content approx. 81 to 85% by weight Resin 2 Commercial urea-formaldehyde resin etherified with methanol, carbamatized (i.e. product comprises structural units of the formula (II)), solvent-free Resin 3 Commercial urea-formaldehyde resin etherified with methanol, carbamatized, dissolved in water, solids content approx. 75 to 79% by weight Resin 4 Commercial urea-formaldehyde resin etherified with methanol, non-carbamatized, dissolved in water, solids content approx. 75 to 79% by weight Modified Resins:

In addition, additives were used to produce modified resins. For this purpose, one of resins 1 to 4 in each case was mixed with the desired additives and heated at a temperature of 80° C. and a pH of 7 to 8 for 2 h. The additives used and the amounts used (weight ratios) are each specified in table 1.

Production of Cured Sand Compositions (general method):

In each case 8 g of the selected resin and 0.24 g of the selected hardener were mixed with one another. Then sand (particle size approx. 0.3 to 0.8 mm) was added and mixed in. The mixture was pressed into a mold and cured at 57° C. overnight. Thereafter, the cured composition was removed from the mold for further tests. The resulting moldings had the dimensions of 8 cm×1 cm×0.5 cm. The resins and hardeners used in each case are compiled in table 1.

Performance Tests

The samples were used to carry out the following tests:

Appearance and Strength

The appearance and the strength of the moldings were each assessed qualitatively.

Water Resistance

Phase 1:

To determine the water resistance, the samples were stored at a temperature of 80° C. in water for 2 h and then dried. After storage in water, the appearance and the strength of the moldings was again assessed qualitatively. What is especially important is whether the moldings survived the test or fell apart.

Thereafter, the samples (where still possible) were stored once again in water at room temperature for 20 days (phase 2).

Subsequently, the samples were stored at 80° C. in water for 2 months, and the time until damage to the samples was noted (phase 3).

The results are each listed in table 1.

Flexibility:

Mechanical properties of the samples were also measured, specifically the flexural strength and the breaking stress. The measurements were performed to ISO 178 on 80 mm×10 mm×5 mm samples. In the analysis, the distance between the two load points was 64 mm, the bending rate was 2 mm/min, and the analysis temperature was room temperature.

The samples analyzed and the results obtained are compiled in table 2.

TABLE 1

Composition of the cured sand compositions produced, and water stability tests

| Example no. | Resin | Hardener | Appearance after removal from the mold | Water stability test Phase 1 | Phase 2 | Phase 3 |
|---|---|---|---|---|---|---|
| I-1 | resin 1 | NH$_4$Cl | o.k. | — | — | — |
| I-2 | resin 1 | NH$_4$NO$_3$ | o.k. | — | — | — |
| I-3 | resin 1 | maleic acid | o.k. | o.k. | o.k. | 1 day |
| I-4 | resin 2 | NH$_4$Cl | o.k. | o.k. | o.k. | >2 mon. |
| I-5 | resin 2 | NH$_4$NO$_3$ | o.k. | o.k. | o.k. | >2 mon. |
| I-6 | resin 2 | maleic acid | o.k. | — | — | — |
| I-7 | resin 2 + 3-aminopropyltriethoxysilane (1:0.11) | NH$_4$Cl | o.k. | o.k. | o.k. | >2 mon. |
| I-8 | resin 2 + 3-aminopropyltrimethoxysilane (1:0.05) | NH$_4$Cl | o.k. | o.k. | o.k. | >2 mon. |
| I-9 | resin 2 + 3-aminopropyltrimethoxysilane (1:0.05) | NH$_4$NO$_3$ | o.k. | o.k. | o.k. | >2 mon. |
| I-10 | resin 3 + 3-aminopropyltrimethoxysilane (1:0.05) | NH$_4$Cl | o.k. | o.k. | o.k. | >2 mon. |
| I-11 | resin 3 + 3-aminopropyltrimethoxysilane (1:0.05) | NH$_4$NO$_3$ | o.k. | o.k. | o.k. | >2 mon. |
| I-12 | resin 3 + 3-aminopropyltriethoxysilane (1:0.13) | NH$_4$Cl | o.k. | o.k. | o.k. | 1 day |
| I-13 | resin 4 + ethylene glycol (1:0.6) | maleic acid | o.k. | o.k. | o.k. | 1 day |
| I-14 | resin 4 + 3-aminopropyltriethoxysilane (1:0.6) | maleic acid | o.k. | o.k. | o.k. | 1 day |
| I-15 | resin 2 + phenol-formaldehyde resin (1:0.1) | NH$_4$Cl | o.k. | o.k. | o.k. | >2 mon. |
| I-16 | resin 2 + phenol-formaldehyde resin (1:0.1) | NH$_4$NO$_3$ | o.k. | o.k. | o.k. | >2 mon. |
| I-17 | resin 2 + phenol-formaldehyde resin (1:0.1) | maleic acid | soft, but still o.k. | — | — | — |
| I-18 | resin 2 + poly-THF (1:0.1) | NH$_4$Cl | o.k | o.k. | o.k. | >2 mon. |
| I-19 | resin 2 + poly-THF (1:0.08) | NH$_4$NO$_3$ | o.k. | o.k. | o.k. | >2 mon. |
| I-20 | resin 2 + 3-aminopropyltriethoxysilane + poly-THF (1:0, 1:0.1) | NH$_4$Cl | o.k. | o.k. | o.k. | >2 mon. |
| I-21 | resin 2 + 3-aminopropyltriethoxysilane + poly-THF (1:0, 1:0.1) | NH$_4$NO$_3$ | o.k. | o.k. | o.k. | >2 mon. |

TABLE 2

Results of the mechanical tests

| Example no. | Resin | Hardener | Flexural strength $\sigma_m$ [MPa] | Breaking strength $\sigma_r$ [MPa] |
|---|---|---|---|---|
| II-1 | resin 1 | maleic acid | 3.1 | 3.09 |
| II-2 | resin 2 | NH$_4$Cl | 3.72 | 1.86 |
| II-3 | resin 2 | NH$_4$NO$_3$ | 3.43 | 1.71 |
| II-4 | resin 2 | maleic acid | 1.02 | 0 |

TABLE 2-continued

Results of the mechanical tests

| Example no. | Resin | Hardener | Flexural strength $\sigma_m$ [MPa] | Breaking strength $\sigma_r$ [MPa] |
|---|---|---|---|---|
| II-5 | resin 3 | NH$_4$Cl | 4.19 | 2.09 |
| II-6 | resin 3 | NH$_4$NO$_3$ | 4.72 | 2.35 |
| II-7 | resin 3 | maleic acid | 1.43 | 0 |
| II-8 | resin 2 + phenol-formaldehyde resin (1:0.1) | NH$_4$Cl | 5.48 | 2.74 |
| II-9 | resin 2 + phenol-formaldehyde resin (1:0.1) | maleic acid | 1.18 | 0 |
| II-10 | resin 2 + poly-THF (1:0.1) | NH$_4$Cl | 3.93 | 3.08 |
| II-11 | resin 2 + poly-THF (1:0.08) | NH$_4$NO$_3$ | 3.14 | 1.57 |
| II-12 | resin 2 + poly-THF (1:0.08) | maleic acid | 0.53 | 0 |
| II-13 | resin 2 + 3-aminopropyltrimethoxysilane (1:0.05) | NH$_4$Cl | 3.21 | 1.6 |
| II-14 | resin 2 + 3-aminopropyltrimethoxysilane (1:0.05) | NH$_4$NO$_3$ | 4.17 | 2.08 |
| II-15 | resin 2 + 3-aminopropyltrimethoxysilane (1:0.05) | maleic acid | 0.64 | 0 |
| II-16 | resin 2 + 3-aminopropyltriethoxysilane (1:0.11) | NH$_4$Cl | 3.75 | 1.88 |
| II-17 | resin 2 + 3-aminopropyltrimethoxysilane (1:0.11) | maleic acid | 1.5 | 0 |
| II-18 | resin 2 + 3-aminopropyltrimethoxysilane + phenol-formaldehyde resin | NH$_4$Cl | 3.65 | 1.83 |
| II-19 | resin 2 + 3-aminopropyltrimethoxysilane + phenol-formaldehyde resin | NH$_4$NO$_3$ | 3.19 | 1.59 |
| II-20 | resin 2 + 3-aminopropyltrimethoxysilane + phenol-formaldehyde resin | maleic acid | 3.54 | 1.77 |
| II-21 | resin 2 + 3-aminopropyltriethoxysilane + poly-THF (1:0, 1:0.1) | NH$_4$Cl | 0.42 | 0 |
| II-22 | resin 2 + 3-aminopropyltriethoxysilane + poly-THF (1:0, 1:0.1) | NH$_4$NO$_3$ | 1.14 | 0 |
| II-23 | resin 2 + 3-aminopropyltriethoxysilane + poly-THF (1:0, 1:0.1) | maleic acid | 0.67 | 0 |
| II-24 | resin 2 + ethylene glycol | NH$_4$NO$_3$ | 0.14 | 0 |
| II-25 | resin 2 + ethylene glycol | maleic acid | 0.74 | 0 |
| II-26 | resin 3 + 3-aminopropyltriethoxysilane (1:0, 13) | NH$_4$Cl | too soft | too soft |
| II-27 | resin 3 + 3-aminopropyltriethoxysilane (1:0, 13) | maleic acid | 1.16 | 0 |
| II-28 | resin 4 | NH$_4$Cl | fractured before the test | |
| II-29 | resin 4 | maleic acid | 2.27 | 0 |
| II-30 | resin 4 + 3-aminopropyltrimethoxysilane | NH$_4$Cl | 0.91 | 0 |
| II-31 | resin 4 + 3-aminopropyltrimethoxysilane | maleic acid | 3.12 | 1.55 |
| II-32 | resin 4 + 3-aminopropyltriethoxysilane | NH$_4$NO$_3$ | 0.46 | 0 |
| II-33 | resin 4 + 3-aminopropyltriethoxysilane | maleic acid | 2.43 | 1.21 |
| II-34 | resin 4 + ethylene glycol | NH$_4$Cl | 2.63 | 1.32 |
| II-35 | resin 4 + ethylene glycol | maleic acid | 3.43 | 1.71 |

2. Test Series

For the tests, the following urea-formaldehyde resins were synthesized:

Resin 5 Urea-formaldehyde resin etherified with n-butanol, formed from urea (1 mol), formaldehyde (1.8 mol), n-butanol (0.6 mol) and 1,4-butanediol (0.5 mol), solution in n-butanol (approx. 60% by weight of resin)

Resin 6 Urea-formaldehyde resin etherified with methanol, formed from urea (1 mol), formaldehyde (2.3 mol), methanol (0.6 mol) and 1,4-butanediol (0.5 mol), solvent-free Resin 7 Urea-formaldehyde resin etherified with methanol, formed from urea (1 mol), formaldehyde (2.2 mol), methanol (1.0 mol) and 1,4-butanediol (0.5 mol), solution in water (approx. 75% by weight of resin)

Resin 8 Urea-formaldehyde resin etherified with n-butanol, formed from urea (1 mol), formaldehyde (2.3 mol), n-butanol (1.3 mol), solution in n-butanol (approx. 85% by weight of resin)

Production of the Specimens Used:

To produce the specimens, in each case 5 g of the selected resin were mixed with 1 g of an aqueous solution of the hardener (35% by weight of hardener in water) at room temperature.

When 2 hardeners were used, they were used in a ratio of 1:1. Then sand (particle size approx. 0.3 to 0.8 mm) was added and mixed in. Using a silicone mold, rod-shaped specimens of length 8 cm, width 1 cm, thickness 0.4 cm were produced from the mixture, and cured at 140° C. for 1 h. After the curing, the specimens were removed from the mold. The specimens produced are compiled in table 3.

In a further test series, the curing of the samples was undertaken at room temperature.

Production of Specimens with Modified Resins:

In each case 10 g of resins 5, 6 or 7 are mixed with 2 g of an aqueous solution of the hardener (maleic anhydride/ammonium nitrate in a ratio of 1:1, 35% by weight in water) and 1 g of a selected additive. Thereafter, 100 g of sand (particle size approx. 0.3 to 0.8 mm) are added and mixed in. When silanes are used as additives, they are not added to the resin but mixed directly with the sand and then allowed to dry partially for 10 min. Specimens (rods) are produced, which are cured at 140° C. for 1 h.

Concentration Series

Resin 7 was mixed in the amount desired in each case was mixed in each case 20% by weight of a solution of the hardener (35% by weight of p-toluenesulfonic acid). Thereafter, in each case 50 g of sand were added, specimens (rods) were produced and they were cured at 140° C. for 1 h. The sand/resin ratio was varied. The samples produced are compiled in table 11.

Performance Tests:

Oil Resistance

In each case a ½ specimen (i.e. length 4 cm, width 1 cm, thickness 0.4 cm) was stored at room temperature in mineral oil. By gentle stirring with a boiling rod, there was a daily test as to whether the specimens were still stable or fell apart into separate parts or completely. The results are compiled in table 4.

Water Resistance

In each case a ½ specimen (i.e. length 4 cm, width 1 cm, thickness 0.4 cm) was stored at room temperature in 100 ml of water. By gentle stirring with a boiling rod, there was a daily test as to whether the specimens were still stable or fell apart into separate parts or completely. The results are compiled in table 4.

Brine Resistance

The test was carried out like the water resistance test, except that a salt solution was used as the test medium (89.4 g of NaCl, 52.94 g of $CaCl_2.2H_2O$, 15.06 g of $MgCl_2.6H2O$ dissolved in 1 l of dist. $H_2O$). The results for the samples cured at 140° C. are shown in table 5, compiled, and those of the samples cured at RT in table 7.

Flexural Strength

In addition, the flexural strength of the samples was determined to DIN EN ISO 178 as described above. The results for the samples cured at 140° C. are compiled in table 6, and those for the samples cured at RT in table 8, a concentration series in table 11.

Decomposition Temperature:

The decomposition temperature of individual samples was determined to DIN EN ISO 178 by means of DSC. The results are compiled in table 9.

The performance tests with the modified resins are compiled in table 10.

TABLE 3

Curing at 140° C., oil resistance, hardener in a ratio of 1:1

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| maleic anhydride/ammonium nitrate | >3 mon. | >3 mon. | >3 mon. | * |
| maleic anhydride/ammonium sulfate | >3 mon. | >3 mon. | >3 mon. | 1-4 days |
| maleic anhydride/ammonium phosphate | >3 mon. | >3 mon. | >3 mon. | 1-4 days |
| maleic anhydride/ammonium bromide | 11 to 12 days | >3 mon. | >3 mon. | * |
| p-toluenesulfonic acid | >3 mon. | >3 mon. | >3 mon. | * |
| methanesulfonic acid/ammonium nitrate | <1 day | >3 mon. | >3 mon. | * |
| methanesulfonic acid/ammonium sulfate | <1 day | >3 mon. | >3 mon. | * |
| methanesulfonic acid/ammonium phosphate | <1 day | >3 mon. | >3 mon. | * |
| methanesulfonic acid/ammonium bromide | <1 day | 5 to 6 days | >3 mon. | 1-4 days |
| formic acid/ammonium nitrate | >3 mon. | >3 mon. | >3 mon. | * |
| formic acid/ammonium sulfate | >3 mon. | >3 mon. | >3 mon. | <1 day |
| formic acid/ammonium phosphate | >3 mon. | >3 mon. | >3 mon. | >3 mon. |
| formic acid/ammonium bromide | >3 mon. | >3 mon. | >3 mon. | * |
| phosphoric acid/ammonium nitrate | >3 mon. | >3 mon. | >3 mon. | * |

*: Sample had already fallen apart when removed from the silicone mold, no resistance test in oil possible

TABLE 4

Curing at 140° C., water resistance, hardener in a ratio of 1:1

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| maleic anhydride/ammonium nitrate | >3 mon. | >3 mon. | >3 mon. | * |
| maleic anhydride/ammonium sulfate | >3 mon. | >3 mon. | >3 mon. | 2-3 days |
| maleic anhydride/ammonium phosphate | >3 mon. | 8-9 days | 8-9 days | 3-6 days |
| maleic anhydride/ammonium bromide | >3 mon. | >3 mon. | >3 mon. | * |
| p-toluenesulfonic acid | >3 mon. | >3 mon. | >3 mon. | * |
| methanesulfonic acid/ammonium nitrate | >3 mon. | >3 mon. | >3 mon. | * |
| methanesulfonic acid/ammonium sulfate | >3 mon. | >3 mon. | 10-13 days | * |
| methanesulfonic acid/ammonium phosphate | 10-13 days | 8-9 days | 8-9 days | * |
| methanesulfonic acid/ammonium bromide | >3 mon. | 8-9 days | 10-13 days | 2-3 days |
| formic acid/ammonium nitrate | >3 mon. | >3 mon. | >3 mon. | * |
| formic acid/ammonium sulfate | >3 mon. | >3 mon. | 10 to 13 days | 3-6 days |
| formic acid/ammonium phosphate | >3 mon. | 8-9 days | >3 mon. | >3 mon. |
| formic acid/ammonium bromide | >3 mon. | >3 mon. | >3 mon. | * |
| phosphoric acid/ammonium nitrate | >3 mon. | >3 mon. | >3 mon. | * |

*: Sample had already fallen apart when removed from the silicone mold, no resistance test in water possible

TABLE 5

Curing at 140° C., brine resistance, hardener in a ratio of 1:1

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| maleic anhydride/ammonium nitrate | >3 mon. | >3 mon. | >3 mon. | * |
| maleic anhydride/ammonium sulfate | >3 mon. | 8-11 days | >3 mon. | <1 day |
| maleic anhydride/ammonium phosphate | >3 mon. | >3 mon. | 5-6 days | 1-4 days |
| maleic anhydride/ammonium bromide | >3 mon. | >3 mon. | >3 mon. | * |
| p-toluenesulfonic acid | >3 mon. | >3 mon. | >3 mon. | * |

TABLE 5-continued

Curing at 140° C., brine resistance, hardener in a ratio of 1:1

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| methanesulfonic acid/ammonium nitrate | >3 mon. | >3 mon. | >3 mon. | * |
| methanesulfonic acid/ammonium sulfate | >3 mon. | 8-11 days | >3 mon. | * |
| methanesulfonic acid/ammonium phosphate | 8-11 | 6-7 days | 6-7 days | * |
| methanesulfonic acid/ammonium bromide | 8-11 | >3 mon. | >3 mon. | <1 day |
| formic acid/ammonium nitrate | >3 mon. | >3 mon. | >3 mon. | * |
| formic acid/ammonium sulfate | >3 mon. | >3 mon. | 11-12 days | 1-4 days |
| formic acid/ammonium phosphate | >3 mon. | >3 mon. | 4-5 days | <1 day |
| formic acid/ammonium bromide | >3 mon. | >3 mon. | >3 mon. | * |
| phosphoric acid/ammonium nitrate | >3 mon. | >3 mon. | >3 mon. | * |

*: Sample had already fallen apart when removed from the silicone mold, no resistance test in brine possible

TABLE 6

Curing at 140° C., flexual stranght $\sigma_m$ [Mpa], hardener in a ration 1:1

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| maleic anhydride/ammonium nitrate | 1.80 | 9.05 | 9.62 | * |
| maleic anhydride/ammonium sulfate | 4.74 | 6.19 | 7.37 | 1.38 |
| maleic anhydride/ammonium phosphate | 5.61 | 7.53 | 5.92 | 4.15 |
| maleic anhydride/ammonium bromide | 2.87 | 9.36 | 5.97 | * |
| p-toluenesulfonic acid | 6.56 | 8.18 | 9.96 | * |
| methanesulfonic acid/ammonium nitrate | 0.89 | 6.80 | 6.46 | * |
| methanesulfonic acid/ammonium sulfate | 0.34 | 4.68 | 3.98 | * |
| methanesulfonic acid/ammonium phosphate | 0.70 | 3.58 | 6.36 | * |
| methanesulfonic acid/ammonium bromide | 0.19 | 4.39 | 3.76 | 0.56 |
| formic acid/ammonium nitrate | 3.32 | 9.04 | 7.60 | * |
| formic acid/ammonium sulfate | 5.25 | 6.79 | 7.32 | 1.77 |
| formic acid/ammonium phosphate | 3.92 | 5.07 | 3.66 | 2.81 |
| formic acid/ammonium bromide | 4.10 | 7.13 | 9.50 | * |
| phosphoric acid/ammonium nitrate | 1.59 | 7.54 | 6.71 | * |

*: Sample had already fallen apart when removed from the silicone mold, no test possible, values above 7 MPa are shown in bold type

TABLE 7

Curing at room temperature, brine resistance, hardener in a ratio of 1:1

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| maleic anhydride/ammonium nitrate | >3 mon. | >3 mon. | >3 mon. | 9-10 days |
| maleic anhydride/ammonium sulfate | >3 mon. | >3 mon. | >3 mon. | >3 mon. |
| maleic anhydride/ammonium phosphate | >3 mon. | >3 mon. | 5-6 | >3 mon. |
| maleic anhydride/ammonium bromide | >3 mon. | >3 mon. | >3 mon. | 9-10 days |
| p-toluenesulfonic acid | >3 mon. | >3 mon. | >3 mon. | >3 mon. |
| methanesulfonic acid/ammonium nitrate | >3 mon. | >3 mon. | >3 mon. | 7-8 days |
| methanesulfonic acid/ammonium sulfate | >3 mon. | >3 mon. | >3 mon. | >3 mon. |
| methanesulfonic acid/ammonium phosphate | >3 mon. | >3 mon. | >3 mon. | >3 mon. |
| methanesulfonic acid/ammonium bromide | >3 mon. | >3 mon. | >3 mon. | >3 mon. |
| formic acid/ammonium nitrate | >3 mon. | >3 mon. | >3 mon. | >3 mon. |
| formic acid/ammonium sulfate | * | >3 mon. | >3 mon. | >3 mon. |
| formic acid/ammonium phosphate | * | * | * | * |
| formic acid/ammonium bromide | >3 mon. | >3 mon. | >3 mon. | >3 mon. |
| phosphoric acid/ammonium nitrate | >3 mon. | >3 mon. | >3 mon. | >3 mon. |

*: Sample had already fallen apart when removed from the silicone mold, no resistance test in brine possible

TABLE 8

Curing at room temperature, flexural strength $\sigma_m$ [MPa], hardener in a ratio of 1:1

| Hardener | Resin 5 butanol-esterified, with diol | Resin 6 methanol-esterified, with diol | Resin 7 methanol-esterified, aqueous solution |
|---|---|---|---|
| maleic anhydride/ ammonium nitrate | — | 5.51 | 5.71 |
| maleic anhydride/ ammonium sulfate | — | — | 2.89 |
| maleic anhydride/ ammonium phosphate | — | 1.13 | 1.13 |
| maleic anhydride/ ammonium bromide | — | 6.12 | 6.83 |
| p-toluenesulfonic acid | 5.56 | 9.53 | 8.83 |
| methanesulfonic acid/ ammonium nitrate | 3.75 | 6.47 | 7.77 |
| methanesulfonic acid/ ammonium sulfate | 2.47 | 7.02 | 7.07 |
| methanesulfonic acid/ ammonium phosphate | 1.81 | 6.78 | 5.44 |
| methanesulfonic acid/ ammonium bromide | 4.67 | 8.23 | 8.56 |
| formic acid/ ammonium nitrate | — | 7.09 | — |
| formic acid/ ammonium sulfate | * | — | — |
| formic acid/ ammonium phosphate | * | * | * |
| formic acid/ ammonium bromide | — | 8.73 | — |
| phosphoric acid/ ammonium nitrate | — | — | — |

*: Sample had already fallen apart on removal from the silicone mold
—: No test carried out
Values above 7 MPa are shown in bold type

TABLE 9

Decomposition temperature of the specimens with sand or of comparative samples without sand, measured by means of DSC

| Hardener | Resin 5 butanol-esterified, with diol | Resin 6 methanol-esterified, with diol | Resin 7 methanol-esterified, aqueous solution | Resin 8 butanol-esterified, no diol |
|---|---|---|---|---|
| maleic anhydrid/ ammonium nitrate, cured at 140° C. | 274° C. | 268° C. | 263° C. | 232° C. |
| maleic anhydride/ ammonium nitrate, cured at RT | 268° C. | 281° C. | 271° C. | 230° C. |
| ammonium nitrate, cured at 140° C., only resin, no sand | 266° C. | 280° C. | 273° C. | 210° C. |

TABLE 10

Results of the performance tests with modified resins

| Additive | Resin 5 | Resin 6 | Resin 7 |
|---|---|---|---|
| *Oil resistance* | | | |
| butanediol | <1 day | >3 mon. | >3 mon. |
| polytetrahydrofuran | >3 mon. | >3 mon. | >3 mon. |
| glycerol | <1 day | >3 mon. | >3 mon. |
| diethylene glycol | <1 day | >3 mon. | >3 mon. |
| 3-aminopropyltriethoxysilane | >3 mon. | >3 mon. | >3 mon. |
| 3-aminopropyltrimethoxysilane | >3 mon. | >3 mon. | >3 mon. |

TABLE 10-continued

Results of the performance tests with modified resins

| Additive | Resin 5 | Resin 6 | Resin 7 |
|---|---|---|---|
| *Brine resistance* | | | |
| butanediol | <1 day | >3 mon. | >3 mon. |
| polytetrahydrofuran | >3 mon. | >3 mon. | >3 mon. |
| glycerol | <1 day | >3 mon. | <1 day |
| diethylene glycol | >1 day | >3 mon. | <1 day |
| 3-aminopropyltriethoxysilane | >3 mon. | >3 mon. | >3 mon. |
| 3-aminopropyltrimethoxysilane | >3 mon, | >3 mon. | >3 mon. |
| *Water resistance* | | | |
| butanediol | <1 day | >3 mon. | <1 day |
| polytetrahydrofuran | <1 day | >3 mon. | >3 mon. |
| glycerol | <1 day | >3 mon. | <1 day |
| diethylene glycol | <1 day | >3 mon. | <1 day |
| 3-aminopropyltriethoxysilane | >3 mon. | >3 mon. | >3 mon. |
| 3-aminopropyltrimethoxysilane | >3 mon. | >3 mon. | >3 mon. |
| *Flexural strength [MPa]* | | | |
| butanediol | 0.31 | 4.43 | 1.66 |
| polytetrahydrofuran | 1.48 | 13.88 | 9.82 |
| glycerol | 0.10 | 3.45 | 0.69 |
| diethylene glycol | 0.28 | 3.70 | 1.70 |
| 3-aminopropyltriethoxysilane | 5.56 | 14.67 | 12.09 |
| 3-aminopropyltrimethoxysilane | 6.12 | 12.94 | 14.64 |

TABLE 11

Flexural strength of samples as a function of the amount of resin used; in the case of two reported values, a double determination of the flexural strength was undertaken in each case; this gives an impression of the measurement error

| Resin 7 Amount based on sand [% by wt.] | Flexural strength [MPa] |
|---|---|
| 3% by wt. | 7.2/8.6 |
| 7% by wt. | 14.3/12.8 |
| 10% by wt. | 16.5 |
| 15% by wt. | 27.6 |
| 25% by wt. | 29.2/7.8 |

The examples show that the resins 5, 6 and 7 having structural units (II) achieve better results in all tests than the resin 8 not having any structural units (II). Specimens comprising resin 8 cannot be removed from the mold without problems in many cases, and in that case too generally also exhibit a lower resistance to water, oil and brine. The thermal stability of the samples comprising resins 5, 6 and 7 is also better.

With an increasing amount of resin based on sand, the flexural strength of the samples at first increases significantly, but an amount of more than 15% by weight brings barely any further improvement.

The invention claimed is:
1. A process for binding non-consolidated oxidic inorganic materials selected from the group consisting of
   materials which comprise particles of oxidic inorganic materials, and
   oxidic inorganic materials which have pores, cracks, fractures or fissures, by contacting the inorganic materials with a curable composition comprising at least one curable, etherified amino resin, followed by thermal curing of the resin, wherein the etherified amino resin is an etherified urea-formaldehyde resin which comprises structural units of the general formula (II) or (I) and (II)

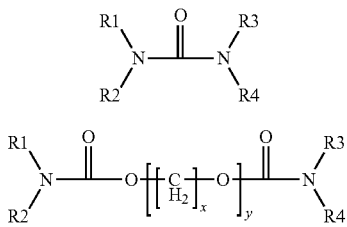

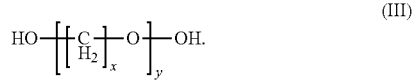

where
the R1, R2, R3 and R4 radicals are each substituents selected from the group of H, —CH$_2$—OH and —CH$_2$—OR',
R' is an aliphatic hydrocarbyl radical having 1 to 10 carbon atoms,
x is from 2 to 8, and
y is from 1 to 20
with the proviso that at least one of the R1, R2, R3 and R4 radicals is a —CH$_2$—OR' radical, and where the amount of the curable composition is 0.5 to 60% by weight based on the inorganic materials, and the curing is undertaken at a temperature from greater than 0° C. to 280° C.

2. The process according to claim 1, wherein the compounds of the formula (II) are obtained by reacting compounds of the formula (I) additionally with a dialcohol of the general formula $$HO-\left[\left[C H_2\right]_x-O\right]_y-OH. \quad (III)$$

3. The process according to claim 1, wherein the curable composition further comprises at least one solvent.

4. The process according to claim 3, wherein the at least one solvent is water or a water-alcohol mixture.

5. The process according to claim 1, wherein the curable composition further comprises at least one acidic hardener.

6. The process according to claim 1, wherein the non-consolidated oxidic inorganic materials comprise silicon dioxide and/or silicatic minerals.

7. The process according to claim 1, wherein the non-consolidated oxidic inorganic materials comprise oxidic inorganic particles.

8. The process according to claim 7, wherein the oxidic inorganic particles have a particle size of 0.01 to 2 mm.

9. The process according to claim 1, which is a process for stabilizing underground formations composed of oxidic inorganic materials, in which the curable composition is injected into the underground formation and cured at the temperatures which exist in the formation.

10. The process according to claim 9, wherein the underground formation is a sand layer.

11. The process according to claim 9, wherein the underground formation has a temperature of 5 to 200° C.

12. The process according to claim 9, wherein the curable composition used has a viscosity of not more than 30 mPas, measured at 25° C.

13. The process according to claim 9, wherein the curable composition used further comprises at least one silane coupling reagent.

14. The process according to claim 7, wherein the oxidic inorganic particles are mixed with the curable composition, shaped to a shaped body and cured.

15. A solid composition composed of inorganic particles and a cured resin, obtainable by a process according to claim 1.

* * * * *